(12) United States Patent
Goto

(10) Patent No.: US 11,172,546 B2
(45) Date of Patent: Nov. 9, 2021

(54) WIRELESS DEVICE ADAPTED TO PERFORM WIRELESS COMMUNICATION

(71) Applicant: JVCKENWOOD Corporation, Yokohama (JP)

(72) Inventor: Ryosuke Goto, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 15 days.

(21) Appl. No.: 16/697,261

(22) Filed: Nov. 27, 2019

(65) Prior Publication Data

US 2020/0100328 A1 Mar. 26, 2020

Related U.S. Application Data

(63) Continuation of application No. PCT/JP2018/005667, filed on Feb. 19, 2018.

(30) Foreign Application Priority Data

May 30, 2017 (JP) .............................. JP2017-106410
May 30, 2017 (JP) .............................. JP2017-106411

(51) Int. Cl.
*H04W 88/18* (2009.01)
*H04W 24/08* (2009.01)
*H04W 84/12* (2009.01)

(52) U.S. Cl.
CPC ........... *H04W 88/18* (2013.01); *H04W 24/08* (2013.01); *H04W 84/12* (2013.01)

(58) Field of Classification Search
CPC ...... H04W 88/18; H04W 24/08; H04W 84/12

USPC ......................................................... 370/329
See application file for complete search history.

(56) References Cited

U.S. PATENT DOCUMENTS

| 4,731,874 | A | 3/1988 | Ichikawa | |
|---|---|---|---|---|
| 9,191,037 | B2 * | 11/2015 | Lascari | ................... H04B 1/14 |
| 2001/0016499 | A1 | 8/2001 | Hamabe | |
| 2011/0028163 | A1 | 2/2011 | Hoshihara | |

(Continued)

FOREIGN PATENT DOCUMENTS

| CN | 102100117 A | 6/2011 |
|---|---|---|
| JP | 2004-080420 A | 3/2004 |

(Continued)

OTHER PUBLICATIONS

International Search Report from Application No. PCT/JP2018/005667 dated Apr. 3, 2018.

(Continued)

*Primary Examiner* — Mong-Thuy T Tran
(74) *Attorney, Agent, or Firm* — Brundidge & Stanger, P.C.

(57) ABSTRACT

A wireless device is a device in a first communication system that uses a first band. A communication interface performs communication by using the first band; A monitoring interface monitors a situation of use of a second band for use by the communication interface and different from the first band, the second band being used in a second communication system different from the first communication system that uses the first band. A controller 18 changes a setting for communication in the communication interface when the situation of use monitored by the monitoring interface changes from non-use to use.

8 Claims, 10 Drawing Sheets

100

(56) References Cited

U.S. PATENT DOCUMENTS

| | | | |
|---|---|---|---|
| 2011/0116490 A1* | 5/2011 | Wilhelmsson | H04W 16/14 370/343 |
| 2013/0244722 A1* | 9/2013 | Rousu | H04B 1/16 455/552.1 |
| 2016/0174163 A1 | 6/2016 | Emmanuel | |
| 2017/0272696 A1* | 9/2017 | Li | H04W 72/1263 |
| 2018/0116004 A1* | 4/2018 | Britt | H04L 69/14 |
| 2018/0167983 A1* | 6/2018 | Salkintzis | H04W 76/15 |
| 2018/0331944 A1* | 11/2018 | Salkintzis | H04L 45/38 |

FOREIGN PATENT DOCUMENTS

| | | |
|---|---|---|
| JP | 2011-004022 A | 1/2011 |
| JP | 2014-068234 A | 4/2014 |
| WO | 2010067726 A1 | 6/2010 |

OTHER PUBLICATIONS

European Extended Search Report from EP Application No. 18809005.4 dated Apr. 30, 2020, 9 pages.

* cited by examiner

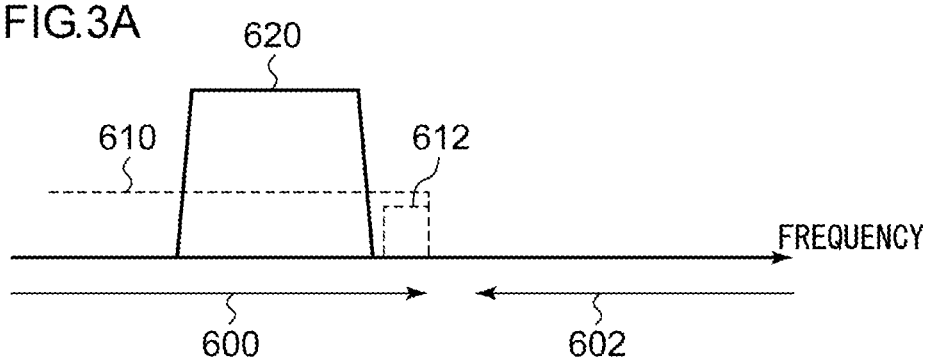
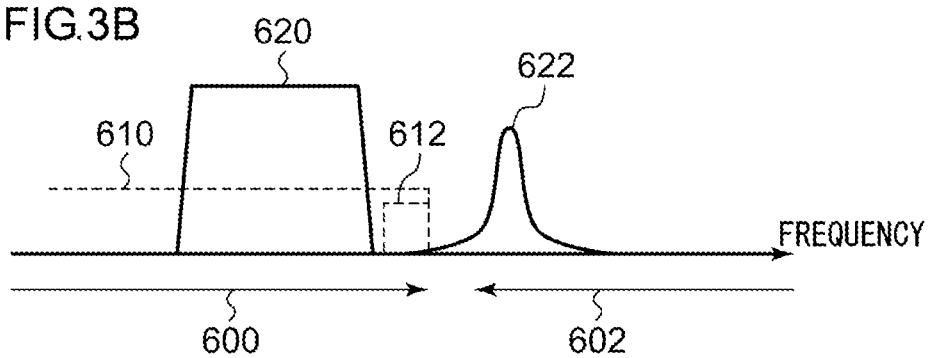
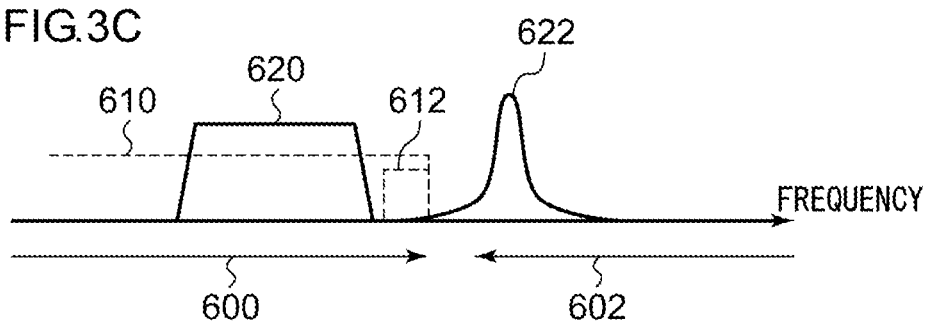
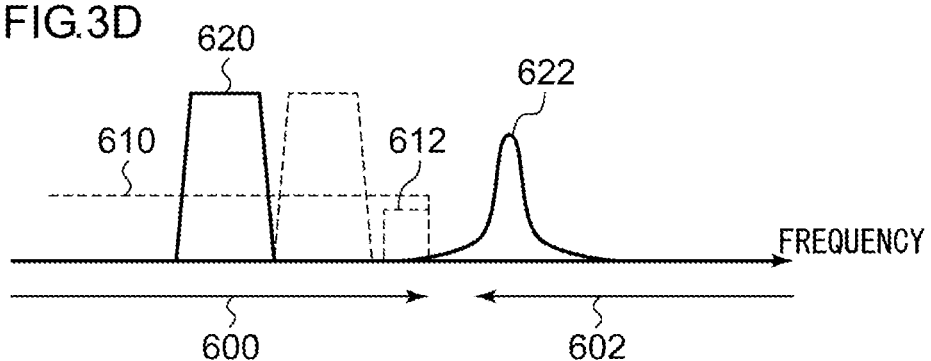

WIRELESS DEVICE ADAPTED TO PERFORM WIRELESS COMMUNICATION

CROSS-REFERENCE TO RELATED APPLICATION

This application is based upon and claims the benefit of priority from the prior Japanese Patent Application No. 2017-106410, filed on May 30, 2017, and Japanese Patent Application No. 2017-106411, filed on May 30, 2017, the entire contents of which are incorporated herein by reference.

BACKGROUND OF THE INVENTION

1. Field

The present invention relates to communication technologies and, more particularly, to wireless devices adapted to perform wireless communication.

2. Description of the Related Art

Communication systems such as electronic toll collection system (ETC), dedicated short range communication (DSRC), and wireless local area network (LAN) have been put into practical use. A vehicle-mounted terminal in which a plurality of these wireless communication schemes can be used switches the wireless communication scheme depending on the status of the driver's vehicle (see, for example, patent literature 1).

PATENT LITERATURE

[Patent Literature 1] JP2004-80420

Generally, a communication device that supports ETC or DSRC and a wireless device that supports wireless LAN are separately built. In the case the communication bands of the devices are adjacent, the use of wireless LAN may interfere with ETC or DSRC.

SUMMARY OF THE INVENTION

The wireless device according to one mode of the embodiment is a wireless device in a first communication system that uses a first band, including: a communication interface that performs communication by using the first band; a monitoring interface that monitors a situation of use of a second band for use by the communication interface and different from the first band, the second band being used in a second communication system different from the first communication system that uses the first band; and a controller that changes a setting for communication in the communication interface when the situation of use monitored by the monitoring interface changes from non-use to use.

Another mode of the embodiment also relates to a wireless device. The device is a wireless device in a first communication system that uses a first band and includes: a communication interface that performs communication by using the first band; a first monitoring interface that monitors a situation of use of a second band for use by the communication interface and different from the first band, the second band being used in a second communication system different from the first communication system that uses the first band; and a second monitoring interface that monitors a situation of use of a third band for use by the communication interface and different from the first band or of a first band, the third band being adapted to be used by the first communication system that uses the first band; and a controller that causes, when the situation of use monitored by the first monitoring interface changes from non-use to use, the communication interface to change from using the first band to using the third band based on the situation of use of the third band monitored by the second monitoring interface.

Optional combinations of the aforementioned constituting elements, and implementations of the embodiment in the form of methods, apparatuses, systems, recording mediums, and computer programs may also be practiced as additional modes of the present embodiment.

BRIEF DESCRIPTION OF THE DRAWINGS

FIGS. 3A, 3B, 3C, and 3D show an outline of a process in the wireless device of FIG. 2;

DETAILED DESCRIPTION OF THE PREFERRED EMBODIMENT

The invention will now be described by reference to the preferred embodiments. This does not intend to limit the scope of the present invention, but to exemplify the invention.

Embodiment 1

The knowledge that provides a basis for the embodiments will be described before describing the invention in specific details. Embodiment 1 relates to a wireless device mounted on a vehicle. The wireless device is capable of performing wireless LAN communication. Wireless LAN uses a frequency band (hereinafter, "first band") of W56 (5470 MHz-5725 MHz) that can be used outdoors in Japan. When a wireless device mounted on a vehicle and terminal device such as a smartphone brought into the vehicle are connected, communication in the first band is performed. To stabilize this communication at a high throughput, the occupied band in wireless LAN is expanded, for example. Meanwhile, a narrow band communication system for traffic vehicles such as DSRC and ETC uses a frequency band (hereinafter, "second band") of W58 (5770 MHz-5850 MHz) in Japan. The second band is adjacent to the first band. When wireless LAN is referred to as a first communication system, a narrow band communication system for traffic vehicles is referred to as a second communication system.

In the case DSRC/ETC communication and wireless LAN communication are performed in a narrow space inside a vehicle, a wireless LAN signal (hereinafter, "first signal") may create radio interference on the DSRC/ETC side. This could prevent DSRC/ETC communication from being performed properly. In the case wireless LAN in the first band is used outdoors, it is mandatory for the device to have a dynamic frequency selection (DFS) function that provides a predefined period of time for radar detection and temporarily suspends wireless LAN radio waves upon detection of a radar signal for the purpose of avoiding interference with a meteorological radar signal or a ship radar signal. However, no provisions are provided that cover concurrent use of DSRC/ETC and wireless LAN.

In order to prevent radio interference from occurring between DSRC/ETC and wireless LAN in a vehicle, it is effective to space the communication device and the wireless device apart from each other, but this requires a distance of several hundred meters, which is impossible considering the space inside the vehicle. Meanwhile, it is also effective to suspend wireless LAN communication during DSRC/ETC communication, but this prohibits stable communication. In other words, stable DSRC/ETC communication not accompanying radio interference and realization of high-throughput, stable wireless LAN communication accompanying expansion of the occupied band contradict each other.

Figure 1:
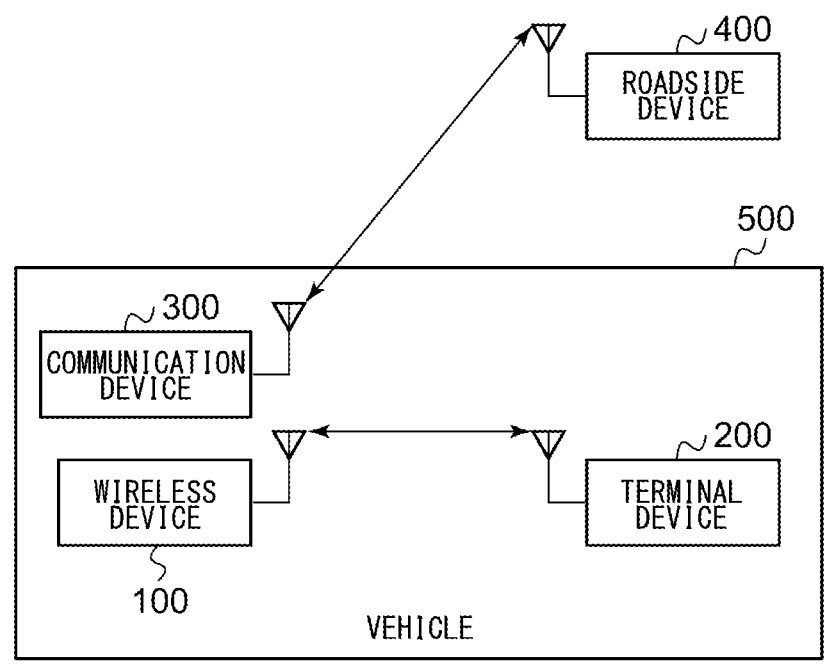
FIG. 1 shows a configuration of a vehicle according to embodiment 1.

FIG. 1 shows a configuration of a vehicle 500 according to embodiment 1. The vehicle 500 includes a wireless device 100, a terminal device 200, and a communication device 300, and a roadside device 400 is provided outside the vehicle 500. The wireless device 100 is a wireless LAN communication device that uses the first band. The wireless device 100 is built in, for example, a car navigation device (not shown) mounted in the vehicle 500. The terminal device 200 is a communication device such as a smartphone brought into the vehicle by a passenger of the vehicle 500. The terminal device 200 supports a communication system other than wireless LAN, but only wireless LAN is of interest here. The terminal device 200 communicates with the wireless device 100 in the first band.

The communication device 300 is a DSRC/ETC communication device that uses the second band. The communication device 300 is mounted in the vehicle 500 within a range of several meters from the wireless device 100. The roadside device 400 is installed outside vehicle 500 and communicates with the communication device 300 in the second band. When the vehicle 500 approaches the roadside device 400 while traveling, communication between the communication device 300 and the roadside device 400 takes place. When the vehicle 500 moves away from the roadside device 400, communication between the communication device 300 and the roadside device 400 does not take place. In other words, interference between wireless LAN and DSRC/ETC may or may not occur in a situation in which wireless LAN communication between the wireless device 100 and the terminal device 200 is taking place inside the vehicle on a constant basis.

Figure 2:
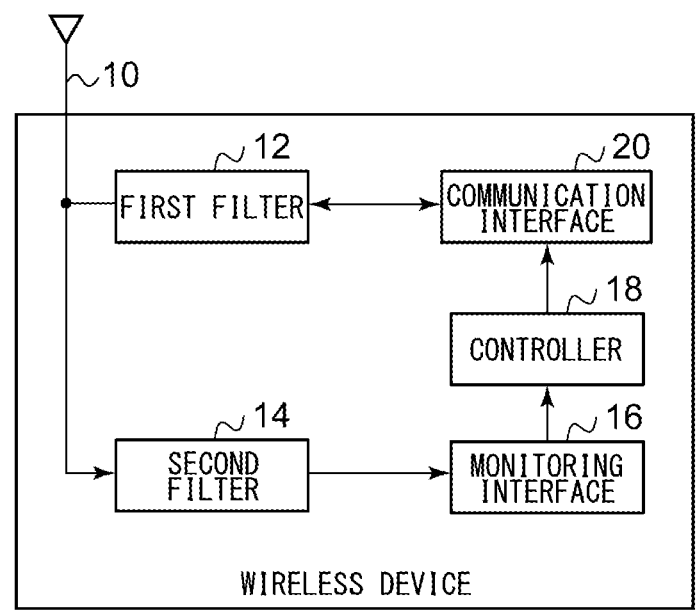
FIG. 2 shows a configuration of the wireless device of FIG. 1.

FIG. 2 shows a configuration of the wireless device 100. The wireless device 100 includes an antenna 10, a first filter 12, a second filter 14, a monitoring interface 16, a controller 18, and a communication interface 20. The antenna 10 is configured to transmit and receive at least a signal in the first band. The antenna 10 is, for example, a patch antenna, but the type of the antenna 10 is not limited to this. A publicly known technology may be used in the antenna 10. The first filter 12 is provided between the antenna 10 and the communication interface 20 described later and passes a signal in the first band. In the case the signal in the first band is a transmission signal traveling from the communication interface 20 toward the antenna 10, the signal in the first band is the first signal. Meanwhile, in the case the signal in the first band is a transmission signal traveling from the antenna 10 toward the communication interface 20, the signal in the first band is the first signal or a portion of a DSRC/ETC signal (hereinafter, "second signal").

FIGS. 3A-3D show an outline of a process in the wireless device 100. Referring to FIG. 3A, the horizontal axis represents the frequency. As illustrated, the first band 600 and the second band 602 are arranged adjacent to each other. By way of one example, it is assumed here that the first band 600 is the W56 frequency band, and the second band 602 is the W58 frequency band. Therefore, the second band 602 is provided on the side of the first band 600 higher in frequency than the first band 600. A first signal 620 is shown in the first band 600. A first filter characteristic 610 shows the characteristic of the first filter 12. For clarity of the description, the figures show the pass band in the first filter characteristic 610 as matching the first band 600. Alternatively, the bands may not match and be displaced from each other so long as the first signal 620 in the highest frequency channel in the first band 600 can pass the filter. The rest of the description will be given later, and reference is made back to FIG. 2.

The communication interface 20 uses a first band 600 to perform wireless LAN communication. In other words, the communication interface 20 transmits the first signal 620 or receives the first signal 620 to or from the terminal device 200 of FIG. 1. The communication interface 20 may receive the first signal 620 from a wireless LAN device other than the terminal device 200. For clarity of the description, wireless LAN devices other than the terminal device 200 are omitted here. The bandwidth of the first signal 620 in wireless LAN is variable such that the width may be 20 MHz, 40 MHz, 80 MHz, etc. In this case, 40 MHz is defined as the first bandwidth, and 20 MHz is defined as the second bandwidth. The transmission power of the first signal 620 transmitted from the communication interface 20 is variable. It will be assumed here that a first transmission power and a second transmission power smaller than the first transmission power are defined. In a basic state in which DSRC/ETC communication is not performed, the first bandwidth and the first transmission power are defined in the communication interface 20.

The second filter 14 is provided to branch from a node between the first filter 12 and the antenna 10. A reception signal from the antenna 10 is input to the second filter 14. The second filter 14 has a bandwidth narrower than that of the first filter 12 and passes signals in a portion of the first band 600 more toward the second band 602 than the other portions. Referring to FIG. 3A, the characteristic of the second filter 14 is shown as a second filter characteristic 612. The highest frequency of the second filter characteristic 612 is illustrated as matching the highest frequency of the first band 600 and of the first filter characteristic 610 but may be on the side thereof higher in frequency. Reference is made back to FIG. 2.

The monitoring interface 16 is connected to the second filter 14 and receives a signal output from the second filter 14. In particular, the monitoring interface 16 receives a signal at a point of time when the communication interface 20 does not receive the first signal 620. In other words, the monitoring interface 16 receives a signal received in the antenna 10. The monitoring interface 16 monitors the situation of use of the second band 602 based on the signal output from the second filter 14. To describe this process in specific details, FIGS. 3A-3B will be used. FIG. 3A shows that the first signal 620 is located in the first band 600, but no signals are located in the second band 602. In other words, FIG. 3A shows a basic state in which DSRC/ETC communication is not performed. In this case, the signal output from the second filter 14, i.e., the signal included in the second filter characteristic 612 is of a noise level, and the signal level thereof is generally low. It should be noted that the signal level is indicated by the power of the signal.

Meanwhile, FIG. 3B shows that a second signal 622 is located in the second band 602. In other words, FIG. 3B shows a state in which DSRC/ETC communication is performed and interference could occur. In this case, the signal output from the second filter 14, i.e., the signal included in the second filter characteristic 612 is a leak component of the second signal 622. Therefore, the signal level thereof is approximately that of a leak power and will be higher than a noise level. Reference is made back to FIG. 2. In other words, the monitoring interface 16 calculates the level of the signal output from the second filter 14 and determines that the second band 602 is not used when the signal level is lower than a threshold value. When the signal level is equal to or higher than the threshold value, on the other hand, the monitoring interface 16 determines that the second band 602 is used. This is equivalent to monitoring the situation of use of the second band 602 by using the leak component of the second signal 622 in the second band 602. The monitoring interface 16 outputs a determination result to the controller 18.

The controller 18 receives the determination result from the monitoring interface 16 and controls the setting for communication in the communication interface 20 based on the determination result. The setting for communication in the communication interface 20 is at least one of the transmission power of the first signal 620 and the bandwidth of the first signal 620. When the determination result indicates a non-use situation, the controller 18 sets the first transmission power and the first bandwidth as described above.

When the situation of use changes from non-use to use, the controller 18 changes the first transmission power to the second transmission power. Since the second transmission power is lower than the first transmission power, the controller 18 can be said to reduce the transmission power in the communication interface 20. The result of such control is shown in FIG. 3C. The transmission power of the first signal 620 is reduced as compared with the power shown in FIGS. 3A-3B. When the situation of use changes from non-use to use, the controller 18 may lower the transmission power in stages.

When the situation of use changes from non-use to use, the controller 18 changes from the first bandwidth to the second bandwidth. Since the second bandwidth is narrower than the first bandwidth, the controller 18 can be said to narrow the bandwidth of the first signal 620 transmitted from the communication interface 20. The result of such control is shown in FIG. 3D. The bandwidth of the first signal 620 is narrowed as compared with the bandwidth shown in FIGS. 3A-3B. The bandwidth may be available in three stages including 80 MHz, or four stages including 80 MHz and 160 MHz, instead of two stages.

When the situation of use changes from non-use to use, the controller 18 may change from the first transmission power to the second transmission power concurrently with changing from the first bandwidth to the second bandwidth. Further, when the situation of use changes from use to non-use, the controller 18 may revert the setting in the communication interface 20 to use the first transmission power and the first bandwidth.

The features are implemented in hardware such as a CPU, a memory, or other LSI's, of any computer and in software such as a program loaded into a memory. The figure depicts functional blocks implemented by the cooperation of these elements. Therefore, it will be understood by those skilled in the art that the functional blocks may be implemented in a variety of manners by hardware only, software only, or by a combination of hardware and software.

Figure 4:
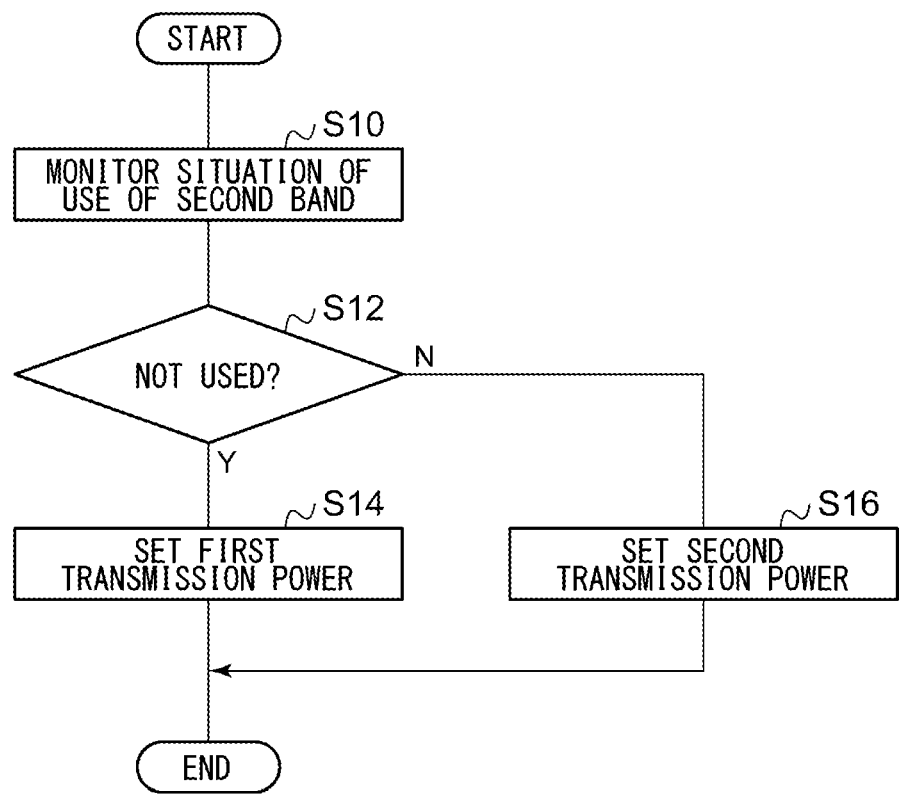
FIG. 4 is a flowchart showing a sequence of steps performed by the wireless device of FIG. 2.

A description will be given of the operation of the wireless device 100 having the above configuration. FIG. 4 is a flowchart showing a sequence of steps performed by the wireless device 100. The monitoring interface 16 monitors the situation of use of the second band 602 (S10). When the situation of use of the second band 602 is "non-use" (Y in S12), the controller 18 sets the first transmission power (S14). When the situation of use of the second band 602 is not "non-use" (N in S12), the controller 18 sets the second transmission power (S16).

Figure 5:
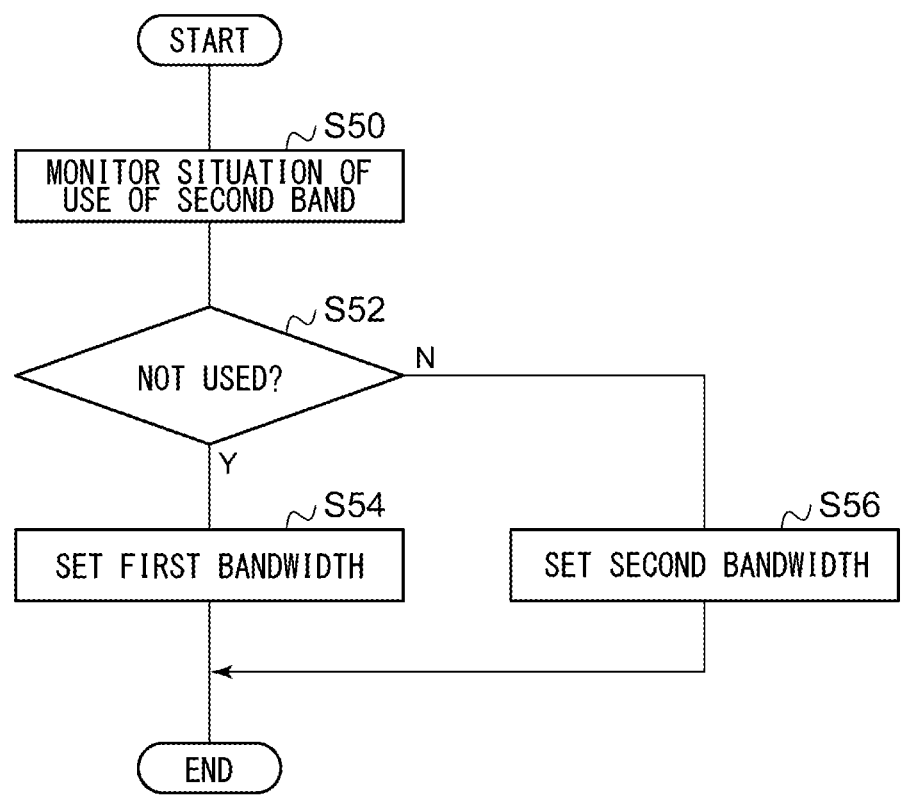
FIG. 5 is a flowchart showing another sequence of steps performed by the wireless device of FIG. 2.

FIG. 5 is a flowchart showing another sequence of steps performed by the wireless device 100. The monitoring interface 16 monitors the situation of use of the second band 602 (S50). When the situation of use of the second band 602 is "non-use" (Y in S52), the controller 18 sets the first bandwidth (S54). When the situation of use of the second band 602 is not "non-use" (N in S52), the controller 18 sets the second bandwidth (S56).

According to the embodiment, the situation of use of the second band used for DSRC/ETC different from wireless LAN is monitored, and, when the situation of use changes from non-use to use, the setting for communication in the communication interface is changed. Therefore, the impact on DSRC/ETC is reduced. Further, the situation of use of the second band is monitored based on the output from the second filter, which has a narrower bandwidth than the first filter and passes a signal in the portion of the first band toward the second band. Therefore, the situation of use of the second band can be estimated within the device. Still further, the transmission power is reduced when the situation of use changes from non-use to use. Therefore, the occurrence of interference is inhibited. Still further, the bandwidth of the signal is narrowed when the situation of use changes from non-use to use. Therefore, the occurrence of interference is inhibited. Still further, the occurrence of interference is inhibited so that the wireless device and the communication device can be arranged in a narrow space in a vehicle without spacing the devices apart. Still further, the setting in wireless LAN is changed so that a stable operation of a DSRC/ETC narrow band communication system for traffic vehicles is secured without changing the system infrastructure of an existent DSRC/ETC narrow band communication system for traffic vehicles.

Example 2

A description will now be given of embodiment 2. Like embodiment 1, embodiment 2 relates to a wireless LAN device. In embodiment 1, the situation of use of the second band is monitored based on a signal output from the second filter. In embodiment 2, the situation of use of the second band is monitored by using a feature different from that of embodiment 1. The vehicle 500 in embodiment 2 is of the same type as that of FIG. 1. The description below highlights a difference from embodiment 1.

Figure 6:
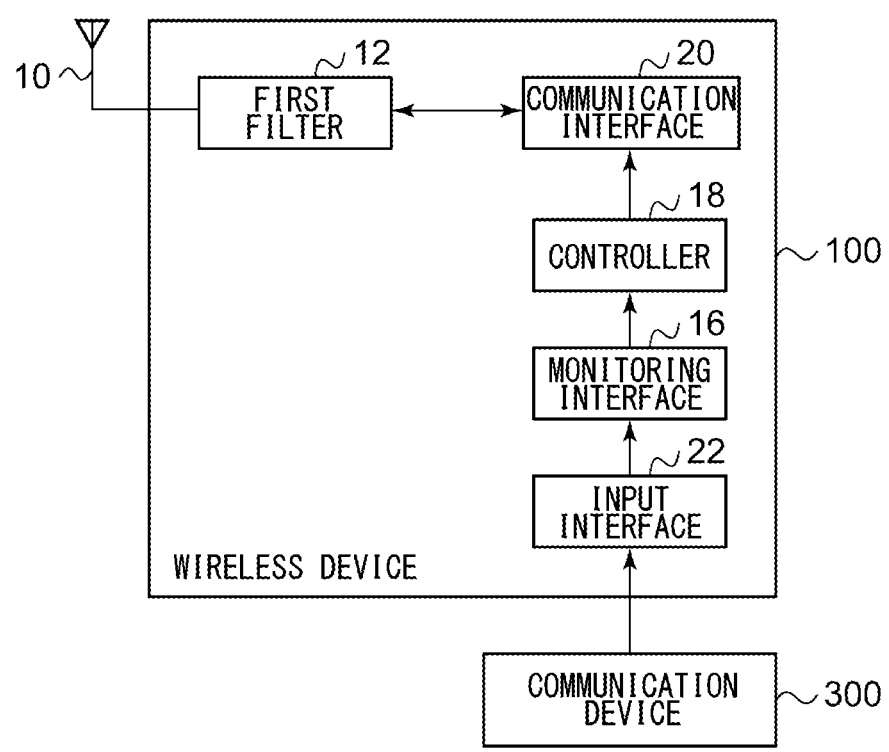
FIG. 6 shows a configuration of the wireless device according to embodiment 2.

FIG. 6 shows a configuration of the wireless device 100. The wireless device 100 includes an antenna 10, a first filter 12, a monitoring interface 16, a controller 18, a communication interface 20, and an input interface 22. The input interface 22 is connected to the communication device 300 by wire or wirelessly. When performing DSRC/ETC communication, the communication device 300 outputs a signal indicating that DSRC/ETC communication is performed to the input interface 22. The signal can be said to be a signal indicating the use of the second band 602.

The monitoring interface 16 monitors the situation of use of the second band 602 based on the signal received in the input interface 22. In other words, the monitoring interface 16 determines that the second band 602 is not used when the input interface 22 does not receive a signal. When the input interface 22 receives a signal, on the other hand, the monitoring interface 16 determines that the second band 602 is used. The signal received in the input interface 22 includes information indicating whether the second band 602 is used or is not used, and the monitoring interface 16 may make a determination based on the information. The monitoring interface 16 outputs a determination result to the controller 18.

According to the embodiment, the situation of use of the second band is monitored based on a signal from the communication device so that the accuracy of recognition of the situation of use is improved.

Embodiment 3

A description will now be given of embodiment 3. In order to prevent radio interference from occurring between DSRC/ETC and wireless LAN in a vehicle, it is effective to space the communication device and the wireless device apart from each other, but this requires a distance of several hundred meters, which is impossible considering the space inside the vehicle. Meanwhile, it is also effective to suspend wireless LAN communication during DSRC/ETC communication, but this prohibits stable communication. In other words, stable DSRC/ETC communication not accompanying radio interference and realization of high-throughput, stable wireless LAN communication accompanying expansion of the occupied band contradict each other. Aside from this, it is possible to move to another frequency band such as the 2.4 GHz band to perform wireless LAN communication during DSRC/ETC communication, but this may produce radio interference with the same or neighboring channel within the wireless LAN system.

Figure 7:
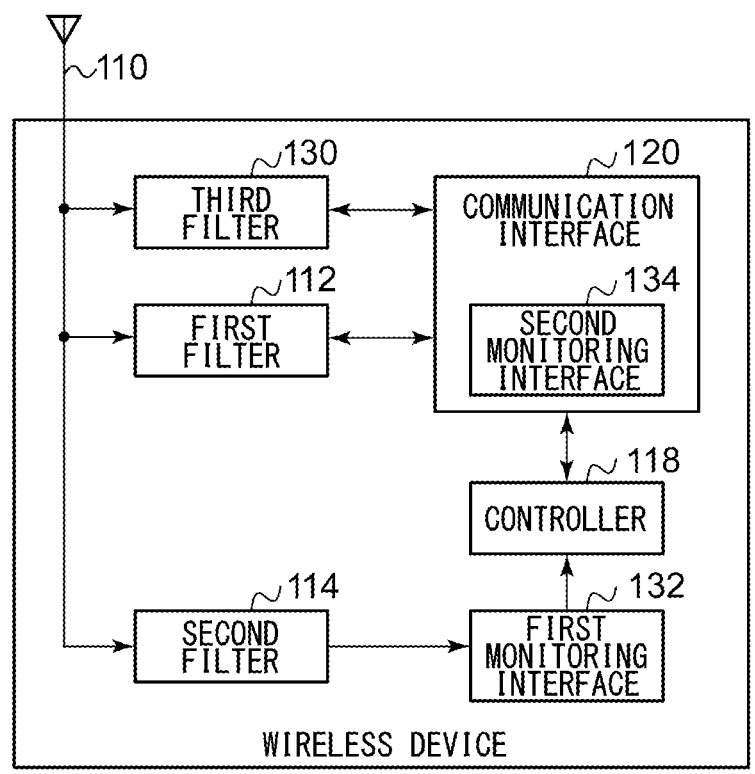
FIG. 7 shows a configuration of the wireless device according to embodiment 3.

The vehicle 500 in embodiment 3 is of the same type as that of FIG. 1. FIG. 7 shows a configuration of the wireless device 100. The wireless device 100 includes an antenna 110, a first filter 112, a second filter 114, a controller 118, a communication interface 120, a third filter 130, and a first monitoring interface 132. The communication interface 120 includes a second monitoring interface 134. The antenna 110 is configured to transmit and receive at least a signal in the first band. The antenna 110 is, for example, a patch antenna, but the type of the antenna 110 is not limited to this. A publicly known technology may be used in the antenna 110. The first filter 112 is provided between the antenna 110 and the communication interface 120 described later and passes a signal in the first band. In the case the signal in the first band is a transmission signal traveling from the communication interface 120 toward the antenna 110, the signal in the first band is the first signal. Meanwhile, in the case the signal in the first band is a transmission signal traveling from the antenna 110 toward the communication interface 120, the signal in the first band is the first signal or a portion of a DSRC/ETC signal (hereinafter, "second signal").

Figure 8A:
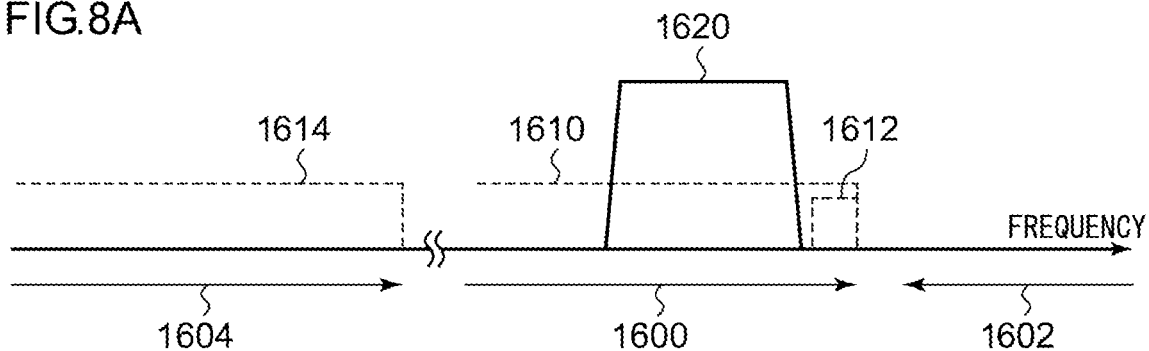
FIGS. 8A, 8B, 8C, and 8D show an outline of a process in the wireless device of FIG. 7.

FIGS. 8A-8D show an outline of a process in the wireless device 100. Referring to FIG. 8A, the horizontal axis represents the frequency. As illustrated, a first band 1600 and a second band 1602 are arranged adjacent to each other. By way of one example, it is assumed here that the first band 1600 is the W56 frequency band, and the second band 1602 is the W58 frequency band. Therefore, the second band 1602 is provided on the side of the first band 1600 higher in frequency. A first signal 1620 is shown in the first band 1600. A first filter characteristic 1610 shows the characteristic of the first filter 112. For clarity of the description, the figures show the pass band in the first filter characteristic 1610 as matching the first band 1600. Alternatively, the bands may not match and be displaced from each other so long as the first signal 1620 in the highest frequency channel in the first band 1600 can pass the filter. Further, a third band 1604 for use by the communication interface 120 and different from the first band 1600 is provided on the side of the first band 1600 lower in frequency. The third band 1604 can also be used for wireless LAN. For example, the third band 1604 is a 2.4 GHz frequency band. The rest of the description will be given later, and reference is made back to FIG. 7.

The communication interface 120 uses the first band 1600 to perform wireless LAN communication. In other words, the communication interface 120 transmits the first signal 1620 or receives the first signal 1620 to or from the terminal device 200 of FIG. 1. The communication interface 120 may receive the first signal 1620 from a wireless LAN device other than the terminal device 200. For clarity of the description, wireless LAN devices other than the terminal device 200 are omitted here. The bandwidth of the first signal 1620 in wireless LAN is variable such that the width may be 20 MHz, 40 MHz, 80 MHz, 160 MHz etc. In this case, the first signal 1620 is defined as having a bandwidth of 40 MHz. The transmission power of the first signal 1620 transmitted from the communication interface 120 is also variable, but it is assumed here that the transmission power has a constant value.

The communication interface 120 can also perform wireless LAN communication by using the third band 1604. In particular, the communication interface 120 selects one of the first band 1600 and the third band 1604 to perform wireless LAN communication. The third filter 130 is provided between the antenna 110 and the communication interface 120 described later and passes a signal (hereinafter, "third signal") in the third band 1604. Referring to FIG. 8A, a third filter characteristic 1614 shows the characteristic of the third filter 130. For clarity of the description, the figure shows the pass band in the third filter characteristic 1614 as matching the third band 1604. Alternatively, the bands may not match so long as the third band 1604 is included. A third signal 1624 is shown in the third band 1604 of FIG. 8C. Reference is made back to FIG. 7.

Given the configuration described above, the communication interface 120 uses the first band 1600 to transmit or receive the first signal 1620 in a basic state in which DSRC/ETC communication is not performed. Between these processes, the second monitoring interface 134 broadcasts a probe request signal periodically in the channels in the third band 1604. In other words, the second monitoring interface 134 performs active scan in the third band 1604 between sessions of wireless LAN communication in the first band 1600. Further, the communication interface 120 receives a probe response signal corresponding to the probe request signal that is broadcast. By receiving a probe response signal, the presence of a wireless LAN device (e.g., an access point) using the third band 1604 is known.

Accordingly, the process is equivalent to monitoring the situation of use of the third band 1604. Further, the second monitoring interface 134 updates the service set identifier (SSID), connection channel, authentication information for re-connection by performing active scan and outputs a result of monitoring the situation of use, which includes these items of information, to the controller 118.

The second filter 114 is provided to branch from a node between the first filter 112 and the antenna 110. A reception signal from the antenna 110 is input to the second filter 114. The second filter 114 has a bandwidth narrower than that of the first filter 112 and passes signals in a portion of the first band 1600 more toward the second band 1602 than the other portions. Referring to FIG. 8A, the characteristic of the second filter 114 is shown as a second filter characteristic 1612. The highest frequency of the second filter characteristic 1612 is illustrated as matching the highest frequency of the first band 1600 and of the first filter characteristic 1610 but may be on the side thereof higher in frequency. Reference is made back to FIG. 7.

The first monitoring interface 132 is connected to the second filter 114 and receives a signal output from the second filter 114. In particular, the first monitoring interface 132 receives a signal at a point of time when the communication interface 120 does not receive the first signal 1620 or the third signal 1624. In other words, the first monitoring interface 132 receives a signal received in the antenna 110. The first monitoring interface 132 monitors the situation of use of the second band 1602 based on the signal output from the second filter 114. To describe this process in specific details, FIGS. 8A-8B will be used. FIG. 8A shows that the first signal 1620 is located in the first band 1600, but no signals are located in the second band 1602. In other words, FIG. 8A shows a basic state in which DSRC/ETC communication is not performed. In this case, the signal output from the second filter 114, i.e., the signal included in the second filter characteristic 1612 is of a noise level, and the signal level thereof is generally low. It should be noted that the signal level is indicated by the power of the signal.

Figure 8B:
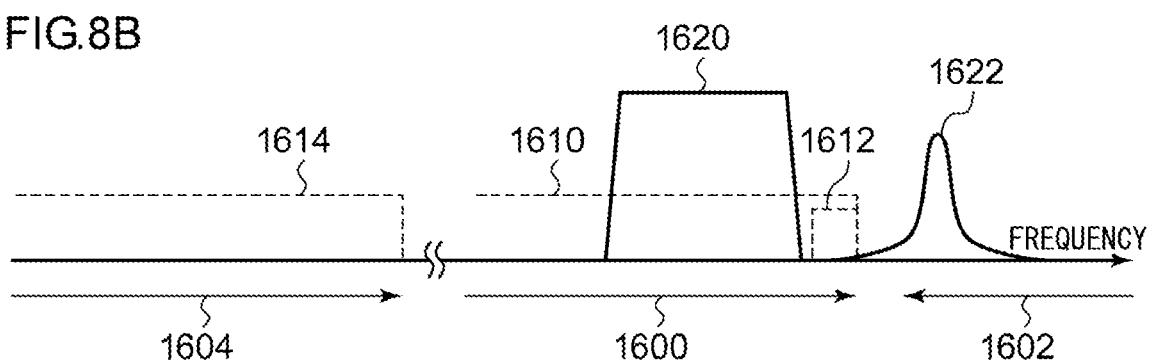

Meanwhile, FIG. 8B shows that a second signal 1622 is located in the second band 1602. In other words, FIG. 8B shows a state in which DSRC/ETC communication is performed and interference could occur. In this case, the signal output from the second filter 114, i.e., the signal included in the second filter characteristic 1612 is a leak component of the second signal 1622. Therefore, the signal level thereof is approximately that of a leak power and will be higher than a noise level. Reference is made back to FIG. 7. In other words, the first monitoring interface 132 calculates the level of the signal output from the second filter 114 and determines that the second band 1602 is not used when the signal level is lower than a threshold value. When the signal level is equal to or higher than the threshold value, on the other hand, the first monitoring interface 132 determines that the second band 1602 is used. This is equivalent to monitoring the situation of use of the second band 1602 by using the leak component of the second signal 1622 in the second band 1602. The first monitoring interface 132 outputs a determination result to the controller 118.

The controller 118 receives the determination result from the first monitoring interface 132 and controls the setting for communication in the communication interface 120 based on the determination result. The setting for communication in the communication interface 120 includes is whether to use the first band 1600 or to use the third band 1604. When the determination result in the first monitoring interface 132 indicates a non-use situation, the controller 118 sets the first band 1600 as described above.

Figure 8C:
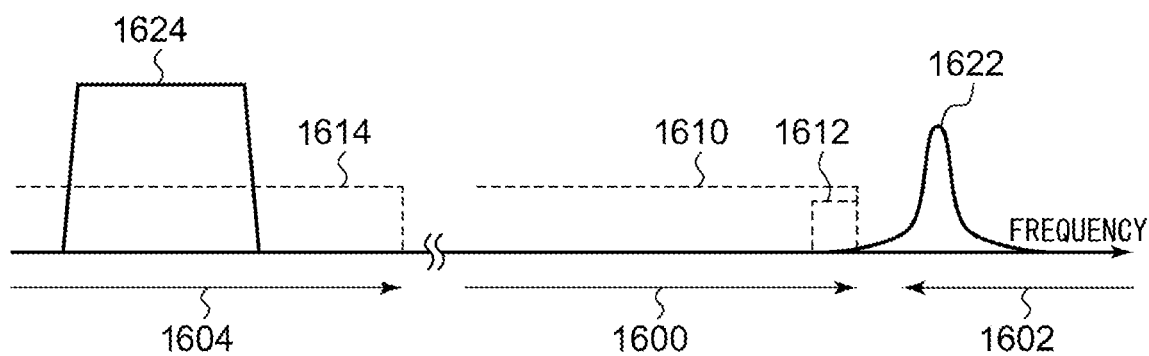

Meanwhile, when the situation of use monitored by the first monitoring interface 132 changes from non-use to use, the controller 118 checks the situation of use monitored by the second monitoring interface 134. The controller 118 selects a channel in the third band 1604 indicated by the situation of use as not being used, i.e., a channel in which a probe response signal is not received. When all channels are used, the controller 118 may not select a channel or select a channel in which the number of probe response signals received is small. When a channel is selected, the controller 118 causes the communication interface 120 to change from using the first band 1600 to using the selected channel in the third band 1604. This is equivalent to connecting to a channel in the third band 1604 with less traffic. The result of such control is shown in FIG. 8C. The transmission of the first signal 1620 in the first band 1600 is suspended, and a third signal 1624 is transmitted in the third band 1604.

Thus, the communication interface 120 uses the third band 1604 to transmit or receive the third signal 1624. Between these processes, the second monitoring interface 134 broadcasts a probe request signal periodically in the channels in the first band 1600. In other words, the second monitoring interface 134 performs active scan in the first band 1600 between sessions of wireless LAN communication in the third band 1604. Further, the communication interface 120 receives a probe response signal corresponding to the probe request signal that is broadcast. By receiving a probe response signal, the presence of a wireless LAN device (e.g., an access point) using the first band 1600 is known. Accordingly, the process is equivalent to monitoring the situation of use of the first band 1600. Further, the second monitoring interface 134 updates the service set identifier (SSID), connection channel, authentication information for re-connection by performing active scan and outputs a result of monitoring the situation of use, which includes these items of information, to the controller 118.

Figure 8D:
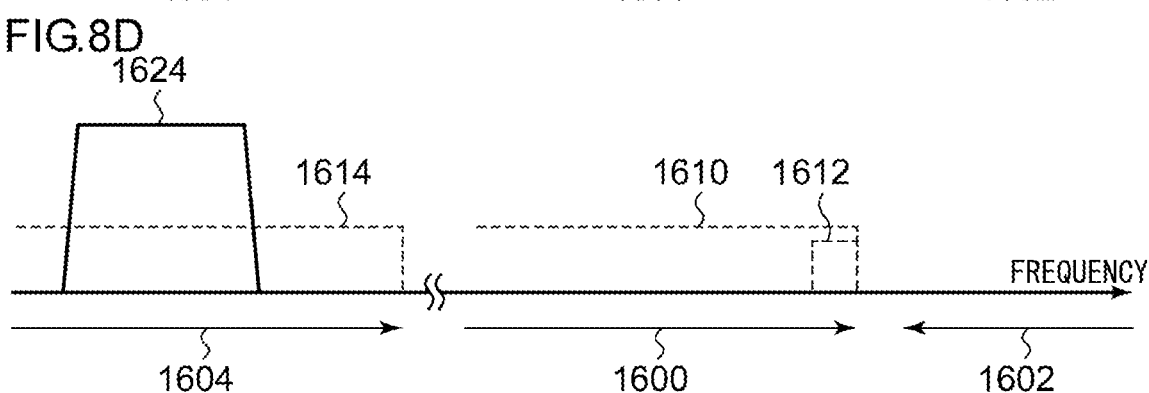

While the communication interface 120 is using the third band 1604, the first monitoring interface 132 monitors the situation of use of the second band 1602 based on the signal output from the second filter 114. FIG. 8D shows a case where the situation of use of the second band 1602 changes to non-use. When the situation of use monitored by the first monitoring interface 132 changes from use to non-use, the controller 118 checks the situation of use monitored by the second monitoring interface 134. The controller 118 selects a channel in the first band 1600 indicated by the situation of use as not being used, i.e., a channel in which a probe response signal is not received. When all channels are used, the controller 118 may not select a channel or select a channel in which the number of probe response signals received is small. When a channel is selected, the controller 118 causes the communication interface 120 to change from using the third band 1604 to using the selected channel in the first band 1600. This is equivalent to connecting to a channel in the first band 1600 with less traffic.

The features are implemented in hardware such as a CPU, a memory, or other LSI's, of any computer and in software such as a program loaded into a memory. The figure depicts functional blocks implemented by the cooperation of these elements. Therefore, it will be understood by those skilled in the art that the functional blocks may be implemented in a variety of manners by hardware only, software only, or by a combination of hardware and software.

Figure 9:
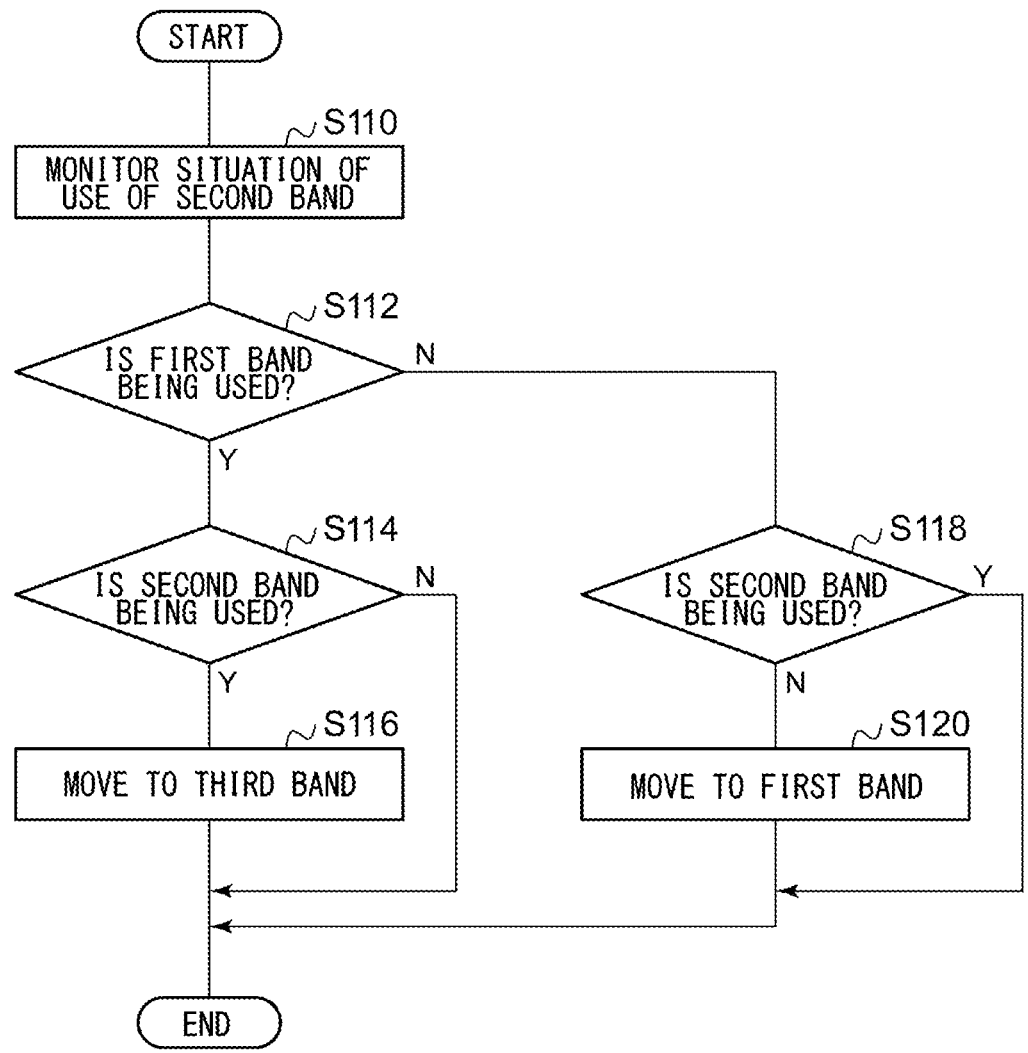
FIG. 9 is a flowchart showing a sequence of steps performed by the wireless device of FIG. 7.

A description will be given of the operation of the wireless device 100 having the above configuration. FIG. 9 is a flowchart showing a sequence of steps performed by the wireless device 100. The first monitoring interface 132 monitors the situation of use of the second band 1602 (S110). When the situation of use of the second band 1602 is "use" (Y in S114) while the communication interface 120 is using the first band 1600 (Y in S112), the controller 118 causes the communication interface 120 to move to the third band 1604 (S116). When the situation of use of the second band 1602 is not "use" (N in S114), step 116 is skipped. When the situation of use of the second band 1602 is not "use" (N in S118) while the communication interface 120 is not using the first band 1600 (N in S112), i.e., while the communication interface 120 is using the third band 1604, the controller 118 causes the communication interface 120 to move to the first band 1600 (S120). When the situation of use of the second band 1602 is "use" (Y in S118), step 120 is skipped.

According to the embodiment, the situation of use of the second band used for DSRC/ETC different from wireless LAN is monitored, and, when the situation of use changes from non-use to use, a change from the use of the first band to the use of the third band is induced. Therefore, the impact on DSRC/ETC is reduced. Further, a change from the use of the third band to the use of the first band is induced when the situation of use of the second band changes from use to non-use. Therefore, the first band can be used when the impact on DSRC/ETC is small. Still further, the situation of use of the second band is monitored based on the output from the second filter, which has a narrower bandwidth than the first filter and passes a signal in the portion of the first band toward the second band. Therefore, the situation of use of the second band can be estimated within the device.

Still further, the occurrence of interference is inhibited so that the wireless device and the communication device can be arranged in a narrow space in a vehicle without spacing the devices apart. Still further, the setting in wireless LAN is changed so that a stable operation of a DSRC/ETC narrow band communication system for traffic vehicles is secured without changing the system infrastructure of an existent DSRC/ETC narrow band communication system for traffic vehicles. Still further, the surrounding environment is constantly checked by a probe request signal in a frequency band other than the band for connection so that wireless LAN re-connection can be established in a desired frequency band immediately upon detecting DSRC/ETC in a radio wave environment that changes minute by minute as the vehicle is traveling.

Embodiment 4

A description will now be given of embodiment 4. Like embodiment 3, embodiment 4 relates to a wireless LAN device. In embodiment 3, the situation of use of the second band is monitored based on a signal output from the second filter. In embodiment 4, the situation of use of the second band is monitored by using a feature different from that of embodiment 3. The vehicle 500 in embodiment 4 is of the same type as that of FIG. 1. The description below highlights a difference from embodiment 3.

Figure 10:
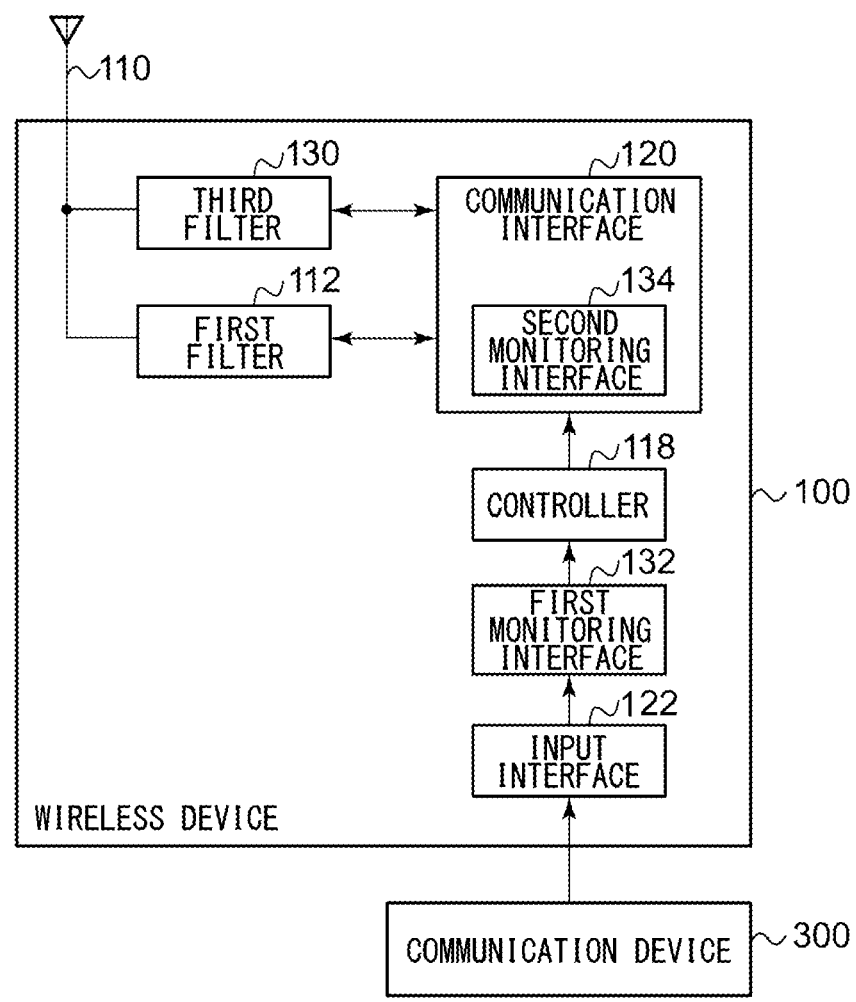
FIG. 10 shows a configuration of the wireless device according to embodiment 4.

FIG. 10 shows a configuration of the wireless device 100 according to embodiment 4. The wireless device 100 includes an antenna 110, a first filter 112, a controller 118, a communication interface 120, an input interface 122, a third filter 130, and a first monitoring interface 132. Further, the communication interface 120 includes a second monitoring interface 134. The input interface 122 is connected to the communication device 300 by wire or wirelessly. When performing DSRC/ETC communication, the communication device 300 outputs a signal indicating that DSRC/ETC communication is performed to the input interface 122. The signal can be said to be a signal indicating the use of the second band 1602.

The first monitoring interface 132 monitors the situation of use of the second band 1602 based on the signal received in the input interface 122. In other words, the first monitoring interface 132 determines that the second band 1602 is not used when the input interface 122 does not receive a signal. When the input interface 122 receives a signal, on the other hand, the first monitoring interface 132 determines that the second band 1602 is used. The signal received in the input interface 122 includes information indicating whether the second band 1602 is used or is not used, and the first monitoring interface 132 may make a determination based on the information. The first monitoring interface 132 outputs a determination result to the controller 118.

According to the embodiment, the situation of use of the second band is monitored based on a signal from the communication device so that the accuracy of recognition of the situation of use is improved.

Described above is an explanation based on an exemplary embodiment. The embodiment is intended to be illustrative only and it will be understood by those skilled in the art that various modifications to constituting elements and processes could be developed and that such modifications are also within the scope of the present invention.

In embodiments 1, 2, the wireless device 100 includes the monitoring interface 16 and the controller 18. Alternatively, the terminal device 200, as well as the wireless device 100, may include the monitoring interface 16 and the controller 18 and perform a process similar to that of the wireless device 100. According to this variation, the scope of application of embodiments 1, 2 can be expanded.

In embodiments 1, 2, it is assumed that the first band 600 is used in wireless LAN and the second band 602 is used in DSRC/ETC. Alternatively, the first band 600 and the second band 602 may be used in a communication system other than wireless LAN and DSRC/ETC. According to this variation, the scope of application of embodiments 1, 2 can be expanded.

In embodiments 3, 4, the wireless device 100 includes the controller 118, the first monitoring interface 132, and the second monitoring interface 134. Alternatively, the terminal device 200, as well as the wireless device 100, may include the controller 118, the first monitoring interface 132, and the second monitoring interface 134 and perform a process similar to that of the wireless device 100. According to this variation, the scope of application of embodiments 3, 4 can be expanded.

In embodiments 3, 4, it is assumed that the first band 1600 is used in wireless LAN and the second band 1602 is used in DSRC/ETC. Alternatively, the first band 1600 and the second band 1602 may be used in a communication system other than wireless LAN and DSRC/ETC. According to this variation, the scope of application of embodiments 3, 4 can be expanded.

What is claimed is:

1. A wireless device in a first communication system that uses a first band, comprising: a central processing unit (CPU) executing instructions stored in a memory that implements:
  a communication interface that performs communication by using the first band;
  a first monitoring interface configured to monitor a situation of use of a second band for use by the communication interface and different from the first band, the second band being used in a second communication system different from the first communication system that uses the first band;

a second monitoring interface configured to monitors a situation of use of a third band or the first band, the third band being different from the first band used by the communication interface, the third band being adapted to be used by the first communication system that uses the first band;

a controller that causes, when the situation of use monitored by the first monitoring interface changes from non-use to use, the communication interface to change from using the first band to using the third band based on the situation of use of the third band monitored by the second monitoring interface;

a first filter provided between the communication interface and an antenna to pass a signal in the first band; and a second filter provided to branch from a node between the first filter and the antenna, having a bandwidth narrower than that of the first filter, and passing a signal in a portion of the first band toward the second band, wherein the first monitoring interface monitors the situation of use of the second band based on an output from the second filter.

2. The wireless device according to claim 1, wherein the first monitoring interface monitors the situation of use of the second band by using a leak component of a signal in the second band.

3. The wireless device according to claim 1, wherein the controller causes, when the situation of use monitored by the first monitoring interface changes from use to non-use, the communication interface to change from using the third band to using the first band based on the situation of use of the first band monitored by the second monitoring interface.

4. The wireless device according to claim 2, wherein the controller causes, when the situation of use monitored by the first monitoring interface changes from use to non-use, the communication interface to change from using the third band to using the first band based on the situation of use of the first band monitored by the second monitoring interface.

5. The wireless device according to claim 1, wherein the first band and the second band are adjacent.

6. The wireless device according to claim 2, wherein the first band and the second band are adjacent.

7. The wireless device according to claim 3, wherein the first band and the second band are adjacent.

8. The wireless device according to claim 4, wherein the first band and the second band are adjacent.

* * * * *